March 10, 1953     J. E. McMULLEN     2,630,631
OPTICAL COMPARISON GAUGE
Filed Aug. 4, 1949
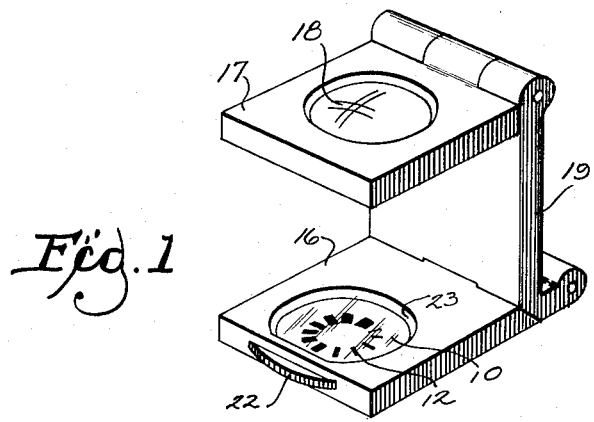
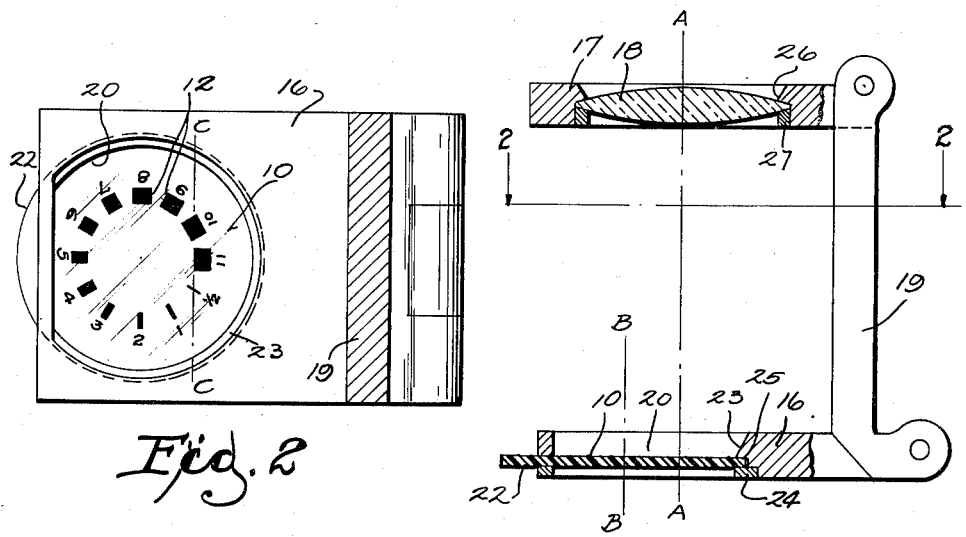
INVENTOR
JOSEPH E. McMULLEN
BY Wheeler, Wheeler & Wheeler
ATTORNEYS Patented Mar. 10, 1953

2,630,631

UNITED STATES PATENT OFFICE 2,630,631

OPTICAL COMPARISON GAUGE

Joseph E. McMullen, Milwaukee, Wis., assignor to The Journal Company, Milwaukee, Wis., a corporation of Wisconsin Application August 4, 1949, Serial No. 108,458

2 Claims. (Cl. 33—174)

This invention relates to improvements in optical comparison gauges.

My gauge is particularly useful in measuring the inaccuracies of placement of printed colors or printed indicia upon a printed surface. In the following specification I shall refer to the use of my gauge in the newspaper printing art where a single web of news print paper is run through a succession of press rolls. Each of these rolls carries a printing plate which is locked in position so that its impress upon the web of news print paper is properly positioned with respect to the impress of other plates on other rollers. If a plate is not locked in the proper position upon its roller, a highly skilled operator must adjust the position of the plate by loosening the lock and inserting a shim, or a number of shims so as to adjust the plate to its proper position. The shims in this art are known as "cards," and each card is of a standard thickness.

Extreme accuracy in the shimming and locking up of plates is required in the color printing of such newspaper printing as is found in multi-colored comic sheets, and a highly skilled operator often finds difficulty in positioning a plate in a roll or in placing his cards so as to correct the placement of a particular plate which does not "register" with other plates. After each test run of paper through the rolls, the operator must determine optically the number of cards required to adjust a particular plate in the desired direction. My new gauge is useful to assist even a skilled operator to determine, in terms of cards, the actual distance which a plate must be moved in order to bring the margins of its impress into registry with the margins of the impress of other plates.

One of the important features of my invention is the provision of a number of separate gauge lines or marks, graduated in widths and provided with calibrations according to the thickness of differing numbers of cards, thereby enabling an operator to select a gauge mark with the proper width to correspond with the space between non-registering impressed lines of a set of plates; and then to read the calibrated number corresponding with that particular gauge line to apprise himself of the number of cards required to correct the printing plate position on the roll.

It is the principal object of my invention to provide an optical comparison gauge which may be placed adjacent a printed surface and moved thereover so as to dispose a selected gauge mark in alignment between specified margin lines whereby an operator may, by selection of a particular gauge mark of correct width, read the calibrations and be advised of the number of cards required to correct the setting of a printing plate upon its roll.

In this connection it is an object of the invention to graduate the gauge in multiples of card thickness so that the gauge reading will indicate directly the number of cards required to be inserted to adjust the plate into registration.

Another object of the invention is to provide a gauge having a series of lines of progressively different widths which may be visually compared with the distance separating non-registering printed lines on a printed web.

It is a further object of the invention to mount the gauge in a magnifier wherein the gauge lines are so disposed with respect to the lens of the magnifier that distortion of the gauge lines as viewed through the lens is reduced to a minimum.

Other objects will be more apparent from an examination of the following disclosure.

In the drawings:

Fig. 1 is a perspective view of a complete gauge instrument embodying the invetnion.

Fig. 2 is a top view of the gauge holder taken in cross section along the line 2—2 of Fig. 3.

Fig. 3 is a side elevational view of the instrument shown in Fig. 1, with portions of the lens holder and gauge holder cut away and shown in section.

Like parts are designated by the same reference characters throughout the several views.

As best shown in Fig. 2 the markings which comprise the gauge may be mounted on a transparent medium 10 which is desirably made of Celluloid or the like. The markings are inscribed on the medium in a dark color, preferably black, and comprise a series of lines or marks of different width, indicated generally at 12. In the preferred embodiments of the invention each mark has parallel rectilinear side margins with which the non-registering lines to be gauged are easily alignable. The lines 12 are radially arranged in a circle pattern and become progressively wider as one reads clockwise around the circle. The several lines are graduated and numbered according to a selected standard. In the instant case the standard selected is the thickness of a "card" which is used as a shim to shift into registry the respective color plates of a multi-color printing press. My gauge shows gauge lines starting with a width corresponding to ½ of the thickness of a card and, as shown in the drawings, successively greater widths, as marked.

In order to facilitate the use of the gauge it may be conveniently mounted in a magnifier. The magnifier comprises a gauge holder 16 and a lens holder 17 carrying a lens 18, the lens holder being supported above the gauge holder 16 on a stand 19 hingedly connected at corresponding side margins of the gauge and lens holder. The magnifier, including the stand 19, lens holder 17, and gauge holder 16, is foldable upon the illustrated hinges into a compact assembly in a manner already well understood in the art to which it pertains.

The gauge holder 16 is apertured at 20 to receive my transparent comparison gauge which may be generally circular as shown in Fig. 2.

The transparent medium 10 comprises a circular disk 22 and is mounted in holder 16 so as to be rotatable therein. The side margin 23 of the aperture 20 is slanted inwardly so as to present a shoulder 25 against which the gauge disk is seated. A snap ring 24 or the like loosely holds the disk in place and permits its rotation in the arcuate slideway between the ring and shoulder 25. A portion of the periphery of the disk 22 projects from the side of the gauge holder and is knurled to facilitate manipulation by the operator's finger to effect rotation of the disk.

The single lens 18 is rigidly mounted in the lens holder 17 between the flange 26 of the lens holder and a snap ring 27.

As best shown in Fig. 3 the center of rotation of the disk 10, indicated by the vertical axis B—B, is offset from the optical axis of the lens 18, which I have indicated as A—A. Although the disk 10 is mounted sufficiently loosely to rotate in its slideway the gauge holder, the clearance is not such as to materially vary the amount of offset as the disk is rotated. This construction is specifically adapted for the purpose of selectively bringing the several gauge lines to a viewing position directly below the center of the lens when the disk is rotated as hereinafter more fully explained.

In order to reduce distortion of the gauge lines as viewed through the single lens magnifying system, the corresponding edges of the gauge lines 12 are disposed in their transparent medium so as to be selectively movable into a viewing position vertically below the optical center of the lens. The corresponding edges of the gauge lines are read along horizontal line C—C which intersects lens axis A—A.

The gauge lines are disposed in a circle upon the disk 10 and are selectively rotatable into a viewing position vertically below the optical center of the magnifying lens. As hereinbefore noted the axis of rotation of the disk, indicated as B—B, is offset from a line dropped vertically from the center upon the disk 10 so that when rotated to a viewing position, one edge of the viewed gauge line will be adjacent the horizontal line C—C which intersects axis A—A. Thus a comparison between the width of the gauge line and the degree of non-registry of the printed areas of contrasting colors may be made at a point directly below the distortionless optical center of the magnifying lens.

In operation, a web of paper is run through the multi-colored press and then examined to discover whether any non-registry of colored areas exists. If any such non-registry appears, the gauge is positioned against the web of paper immediately above the areas of non-registry and the gauge is rotated so as to match one of the gauge lines between the non-registering printed lines. When matched, the respective parallel rectilinear side margins of the proper gauge mark are aligned with the respective non-registering lines and the appropriate gauge line completely fills the space between the non-registering lines on the web. The numeral appearing opposite the appropriate gauge line indicates the number of cards necessary to displace the color plates into a position of accurate registration.

I claim:

1. A comparison gauge comprising a stand having a magnifying lens and a gauge holder constituting a rotary gauge disk mounting, a planiform transparent gauge disk mounted in said holder for rotation in a plane parallel to the plane of the lens, the axis of disk rotation being parallel to and laterally offset from the optical axis of the lens, said disk being provided with a series of gauge lines of progressively different width disposed substantially radially with respect to said axis of disk rotation, corresponding ends of said gauge lines being disposed on a circle centered on said axis of disk rotation and intersecting the optical axis of the lens whereby said gauge line ends may be successively brought by rotation of the disk to a position directly observable through the center of the lens, said gauge holder being provided with a substantially circular opening axially offset from the lens axis and having a peripheral groove, said gauge disk having a peripheral margin rotatably mounting said disk in said groove.

2. The device of claim 1 in which said gauge holder has an edge portion broken away to expose a peripheral margin of the disk to finger manipulation for rotation of the disk.

JOSEPH E. McMULLEN.

REFERENCES CITED

The following references are of record in the file of this patent:

UNITED STATES PATENTS

| Number | Name | Date |
|---|---|---|
| 513,912 | Gardan | Jan. 30, 1894 |
| 573,973 | Harris | Dec. 29, 1896 |
| 1,145,959 | Amstutz | July 13, 1915 |
| 2,054,697 | Fiala | Sept. 15, 1936 |
| 2,195,548 | Wallace | Apr. 2, 1940 |
| 2,376,811 | Rigby | May 22, 1946 |

FOREIGN PATENTS

| Number | Country | Date |
|---|---|---|
| 314,530 | Germany | Sept. 25, 1919 |
| 537,065 | France | May 15, 1922 |
| 796,259 | France | Apr. 3, 1936 |